(12) United States Patent
Williams (10) Patent No.: US 11,102,963 B1
(45) Date of Patent: Aug. 31, 2021

(54) SPECIES SPECIFIC FISH TRAP

(71) Applicant: James Williams, Pensacola Beach, FL (US)

(72) Inventor: James Williams, Pensacola Beach, FL (US)

( * ) Notice: Subject to any disclaimer, the term of this patent is extended or adjusted under 35 U.S.C. 154(b) by 414 days.

(21) Appl. No.: 16/223,293

(22) Filed: Dec. 18, 2018

(51) Int. Cl.
| | |
|---|---|
| *A01M 23/00* | (2006.01) |
| *A01K 69/08* | (2006.01) |
| *E05F 15/73* | (2015.01) |
| *A01M 31/00* | (2006.01) |
| *G06K 9/00* | (2006.01) |
| *A01M 23/14* | (2006.01) |
| *A01M 23/18* | (2006.01) |

(52) U.S. Cl.
CPC ............ *A01K 69/08* (2013.01); *A01M 23/14* (2013.01); *A01M 23/18* (2013.01); *A01M 31/002* (2013.01); *E05F 15/73* (2015.01); *G06K 9/00362* (2013.01)

(58) Field of Classification Search
CPC ....... A01K 69/08; A01M 23/18; A01M 23/14; A01M 31/002; E05F 15/73
USPC ........................................................... 43/100
See application file for complete search history.

(56) References Cited

U.S. PATENT DOCUMENTS

| | | | | |
|---|---|---|---|---|
| 1,680,878 | A * | 8/1928 | Harris ................... | A01M 23/14 43/69 |
| 1,788,047 | A * | 1/1931 | Brunner ................ | A01M 23/18 43/66 |
| 4,447,978 | A * | 5/1984 | Robison ................ | A01K 69/00 43/10 |
| 4,955,005 | A | 9/1990 | Loeffelman | |
| 5,046,278 | A | 9/1991 | Szilagyi | |
| 5,117,572 | A | 6/1992 | Parra | |
| 5,282,178 | A | 1/1994 | Hill | |
| 5,845,431 | A * | 12/1998 | Waite ..................... | A01K 77/00 43/54.1 |
| 8,887,434 | B2 | 11/2014 | Waugh | |
| 9,220,246 | B1 | 12/2015 | Roman | |
| D775,306 | S | 12/2016 | Bodge | |
| 9,516,866 | B2 | 12/2016 | ElHage | |
| 2015/0296766 | A1* | 10/2015 | Gaskamp ........... | G06K 9/00362 43/61 |
| 2016/0000055 | A1* | 1/2016 | Best ....................... | A01K 97/05 43/17.5 |

(Continued)

FOREIGN PATENT DOCUMENTS

WO 2011005723 4/2011

*Primary Examiner* — Claude J Brown
(74) *Attorney, Agent, or Firm* — Kyle A. Fletcher, Esq.

(57) ABSTRACT

The species specific fish trap selectively captures a specific species of fish. The species specific fish trap lures a fish into the species specific fish trap. The species specific fish trap identifies that the captured fish is the specific species the species specific fish trap is configured to capture. The species specific fish trap closes when the lured fish is identified as the specific species that the species specific fish trap is configured to capture. The species specific fish trap comprises a transparent shell, a lure net, and a control system. The lure net and the control system mount in the transparent shell. The transparent shell is the structure that lures and captures the specific species of fish. The lure net lures a fish into the transparent shell. The control system identifies the species of the lured fish. The control system controls access into the transparent shell.

19 Claims, 5 Drawing Sheets

(56) References Cited

U.S. PATENT DOCUMENTS

| | | | | |
|---|---|---|---|---|
| 2016/0106079 | A1* | 4/2016 | Best | A01K 97/05 |
| | | | | 43/102 |
| 2017/0202204 | A1* | 7/2017 | Baxter | A01M 23/08 |
| 2017/0231215 | A1* | 8/2017 | Barton | A01M 31/002 |
| | | | | 43/60 |
| 2019/0166823 | A1* | 6/2019 | Dick | G06K 9/628 |

* cited by examiner

SPECIES SPECIFIC FISH TRAP

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture including animal husbandry and the care of fish, more specifically, a stationary catching device in the form of a rigid trap. (A01K69/06)

SUMMARY OF INVENTION

The species specific fish trap is adapted for use with a specific species of fish. The species specific fish trap selectively captures the specific species of fish. The species specific fish trap lures a fish into the species specific fish trap. The species specific fish trap identifies that the captured fish is the specific species the species specific fish trap is configured to capture. The species specific fish trap closes when the lured fish is identified as the specific species that the species specific fish trap is configured to capture. The species specific fish trap comprises a transparent shell, a lure net, and a control system. The lure net and the control system mount in the transparent shell. The transparent shell is the structure that lures and captures the specific species of fish. The lure net lures a fish into the transparent shell. The control system identifies the species of the lured fish. The control system controls access into the transparent shell.

These together with additional objects, features and advantages of the species specific fish trap will be readily apparent to those of ordinary skill in the art upon reading the following detailed description of the presently preferred, but nonetheless illustrative, embodiments when taken in conjunction with the accompanying drawings.

In this respect, before explaining the current embodiments of the species specific fish trap in detail, it is to be understood that the species specific fish trap is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the species specific fish trap.

It is therefore important that the claims be regarded as including such equivalent construction insofar as they do not depart from the spirit and scope of the species specific fish trap. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The species specific fish 104 trap 100 (hereinafter invention) is adapted for use with a specific species of fish 104. The invention 100 selectively captures the specific species of fish 104. The invention 100 lures a fish 104 into the invention 100. The invention 100 identifies that the captured fish 104 is the specific species the invention 100 is configured to capture. The invention 100 closes when the lured fish 104 is identified as the specific species that the invention 100 is configured to capture. The selected species of fish 104 refers to a species of fish 104 that is targeted for capture by the invention 100. The initial intent of the invention 100 is to remove undesired species of fish 104 from a body of water.

The invention 100 comprises a transparent shell 101, a lure net 102, and a control system 103. The lure net 102 and the control system 103 mount in the transparent shell 101. The transparent shell 101 is the structure that lures and captures the specific species of fish 104. The lure net 102 lures a fish 104 into the transparent shell 101. The control system 103 identifies the species of the lured fish 104. The control system 103 controls access into the transparent shell 101.

The transparent shell 101 is the containment structure of the invention 100. The transparent shell 101 is a hollow structure. The transparent shell 101 is a casing. The transparent shell 101 contains the lure net 102 and the control system 103. The transparent shell 101 is formed with all apertures and form factors necessary to allow the transparent shell 101 to accommodate the use and operation of the invention 100. Methods to form a transparent shell 101 suitable for the purposes described in this disclosure are well-known and documented in the mechanical arts. The transparent shell 101 comprises a transparent sphere 111, an access door 112, an access hinge 113, an interior hook 114, and an exterior hook 115.

The transparent sphere 111 is the hollow spherical structure of the transparent shell 101. The transparent sphere 111 is a transparent structure. The transparent sphere 111 is a plastic structure. The transparent sphere 111 is formed from a polymer selected from the group consisting of: a) acrylic (poly(methyl methacrylic) (CAS 9011-14-7)); and, b) polycarbonate (poly[oxycarbonyloxy-1,4-phenylene(1-methylethylidene)-1,4-phenylene] (CAS 24936-68-3)). The transparent sphere 111 is formed with all apertures and form factors necessary to allow the transparent shell 101 to accommodate the use and operation of the invention 100.

The access door 112 is a rotating barrier that controls access into the hollow interior of the transparent sphere 111. The access door 112 encloses an opening formed in the transparent sphere 111. When in the closed position, the access door 112 traps the fish 104 within the transparent sphere 111. When in the open position, the access door 112 allow the fish 104 access into and out of the transparent sphere 111.

The access hinge 113 is a commercially available rotating device. The access hinge 113 attaches the access door 112 to the transparent sphere 111 such that the access door 112 rotates relative to the transparent sphere 111.

The interior hook 114 is a structure that attaches to the interior surface of the transparent sphere 111. The interior hook 114 forms an anchor point to which the lure net 102 attaches. The exterior hook 115 is a structure that attaches to the exterior surface of the transparent sphere 111. The exterior hook 115 forms an anchor point that allows the transparent sphere 111 to remain in a relatively fixed position.

The lure net 102 is a fish 104 lure that is contained within a mesh bag. The lure of the lure net 102 is contained within the mesh bag. The mesh bag attaches the lure of the lure net 102 to the interior surface of the transparent shell 101. The lure of the lure net 102 is selected such that the lure net will attract the selected species of fish 104.

Figure 5:
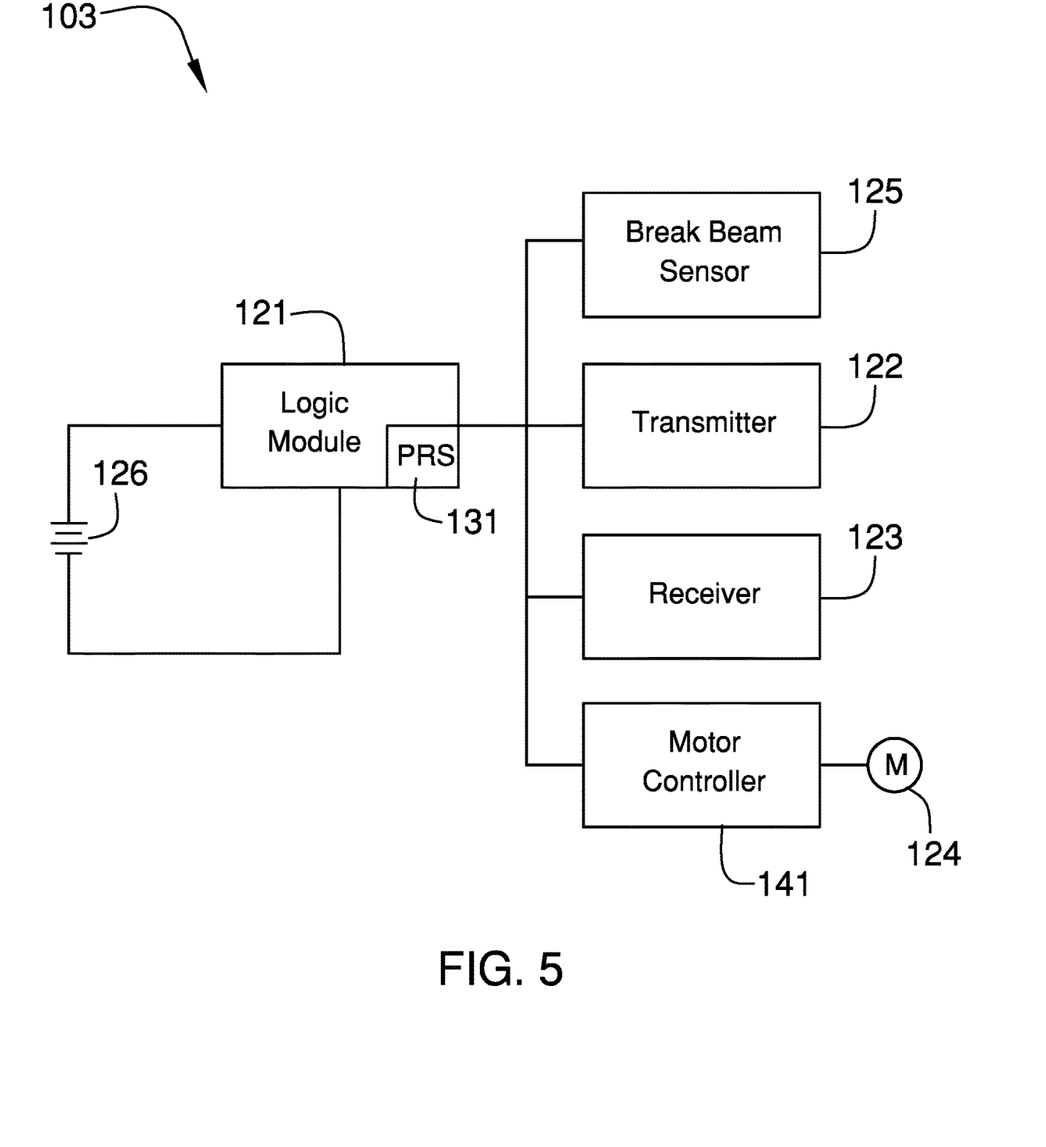
FIG. 5 is a block diagram or schematic view of an embodiment of the disclosure.

The control system 103 is an electromechanical device. The control system 103 detects when a fish 104 has entered the transparent shell 101. The control system 103 traps the fish 104 within the transparent shell 101. The control system 103 uses pattern recognition software 131 to determine whether the captured fish 104 is the selected species of fish 104. The control system 103 releases the captured fish 104 if the captured fish 104 is not recognized as the selected species of fish 104. The control system 103 comprises a logic module 121, a broadband transmitter 122, a receiver 123, a motor 124, a break beam sensor 125, a battery 126, and a housing 127.

The logic module 121 is a commercially available programmable electrical device. The logic module 121 manages and regulates the operation of the control system 103. The logic module 121 controls the operation of the broadband transmitter 122. The logic module 121 controls the operation of the receiver 123. The logic module 121 receives reflection data from the receiver 123. The logic module 121 monitors the operation of the break beam sensor 125.

The logic module 121 further comprises a pattern recognition software 131. The logic module 121 implements the pattern recognition software 131 such that the logic module 121 identifies the selected species of fish 104. The pattern recognition software 131 is an algorithm used by the logic module 121 to identify the selected species of fish 104. The use of pattern recognition software 131 to identify an object is well-known and documented in the artificial intelligence arts. A common example of pattern recognition software 131 includes, but is not limited to, facial recognition software. The pattern recognition software 131 is defined in greater detail elsewhere in this disclosure.

The broadband transmitter 122 is an electrical device. The broadband transmitter 122 generates the radiation that is reflected from the fish 104. The radiation generated by the broadband transmitter 122 is selected from the group consisting of a) electromagnetic radiation; b) ultrasonic radiation; and, 3) a combination of electromagnetic radiation and ultrasonic radiation. The receiver 123 detects the radiation generated by the broadband transmitter 122 that is reflected off of the fish 104. The receiver 123 converts the detected reflected radiation into an electrical signal that is transmitted to the logic module 121.

The motor 124 is an electrical motor. The motor 124 is a submersible motor. The motor 124 attaches to the access door 112 such that the rotation of the motor 124 rotates the access door 112. The motor 124 rotates the access door 112 between the open position and the closed position.

The motor 124 further comprises a motor controller 141. The operation of the motor 124 is controlled by the motor controller 141. The motor controller 141 is an electrical circuit that controls the rotation of the motor 124. The logic module 121 provides the motor controller 141 with the inputs required to operate the motor 124 appropriately. The motor controller 141 is defined in greater detail elsewhere in this disclosure. The logic module 121 controls the operation of the motor 124 using the motor controller 141.

The break beam sensor 125 is a motion sensing device. The break beam sensor 125 generates a beam of non-visible electromagnetic radiation between two sensors. The entry of the fish 104 into the transparent sphere 111 interrupts the beam of non-visible electromagnetic radiation between two sensors such that the logic module 121 will recognize that a fish 104 has entered the transparent sphere 111. By non-visible is meant that the beam of non-visible electromagnetic radiation is not detectable by the fish 104. The break beam sensor 125 triggers the logic module 121 to move the access door 112 into the closed position. The break beam sensor 125 is well-known and documented in the electrical arts.

The battery 126 is a chemical device. The battery 126 provides the electrical energy required to operate the control system 103.

The housing 127 is a fluid impermeable structure that mounts on the transparent sphere 111. The housing 127 is a casing. The housing 127 contains the balance of the control system 103. The housing 127 is formed with all apertures and form factors necessary to allow the housing 127 to accommodate the use and operation of control system 103. Methods to form a housing 127 suitable for the purposes described in this disclosure are well-known and documented in the mechanical arts.

The following six paragraphs describe the theory of operation of the invention 100.

Figure 1:
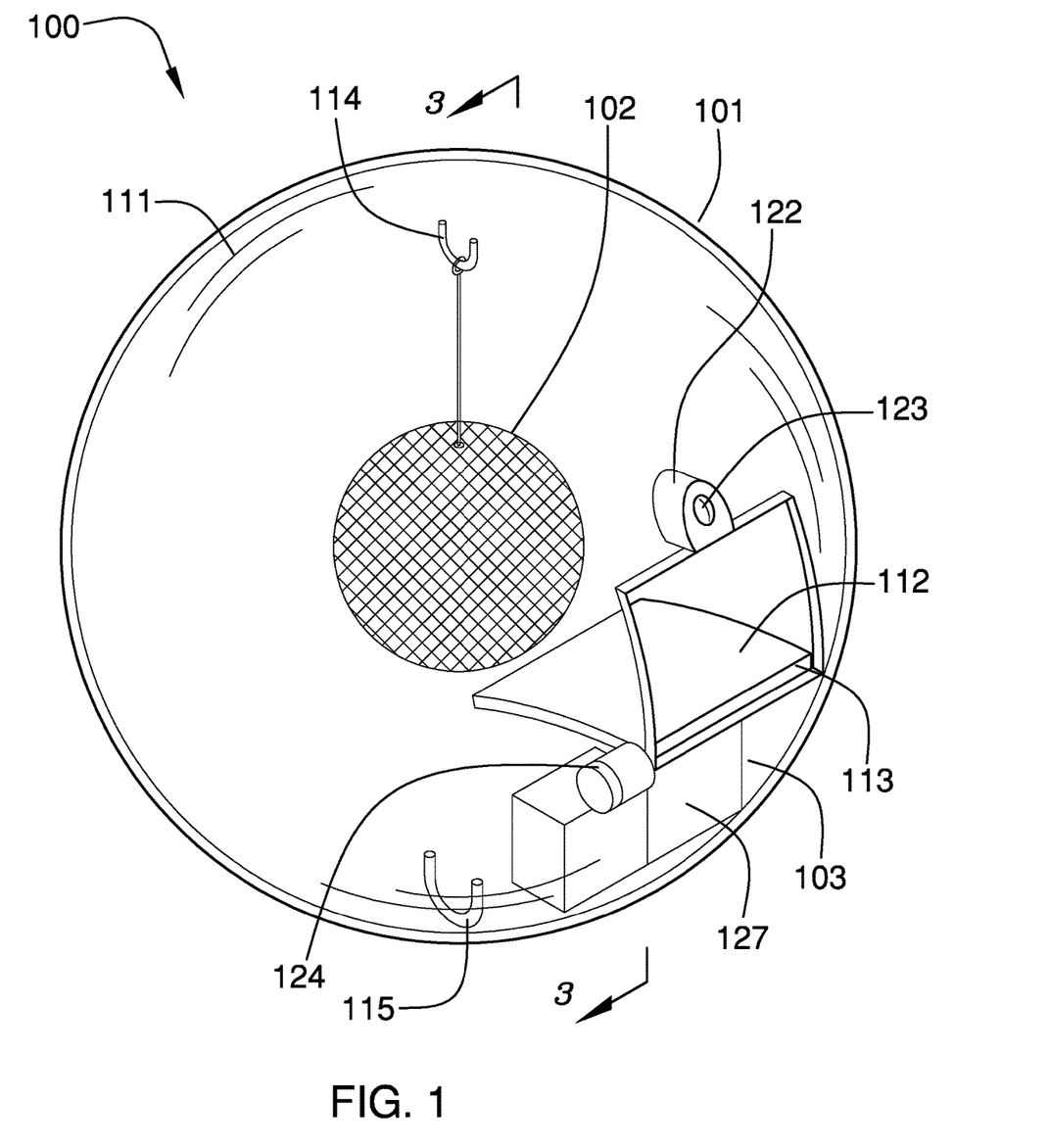
FIG. 1 is a perspective view of an embodiment of the disclosure.
Figure 2:
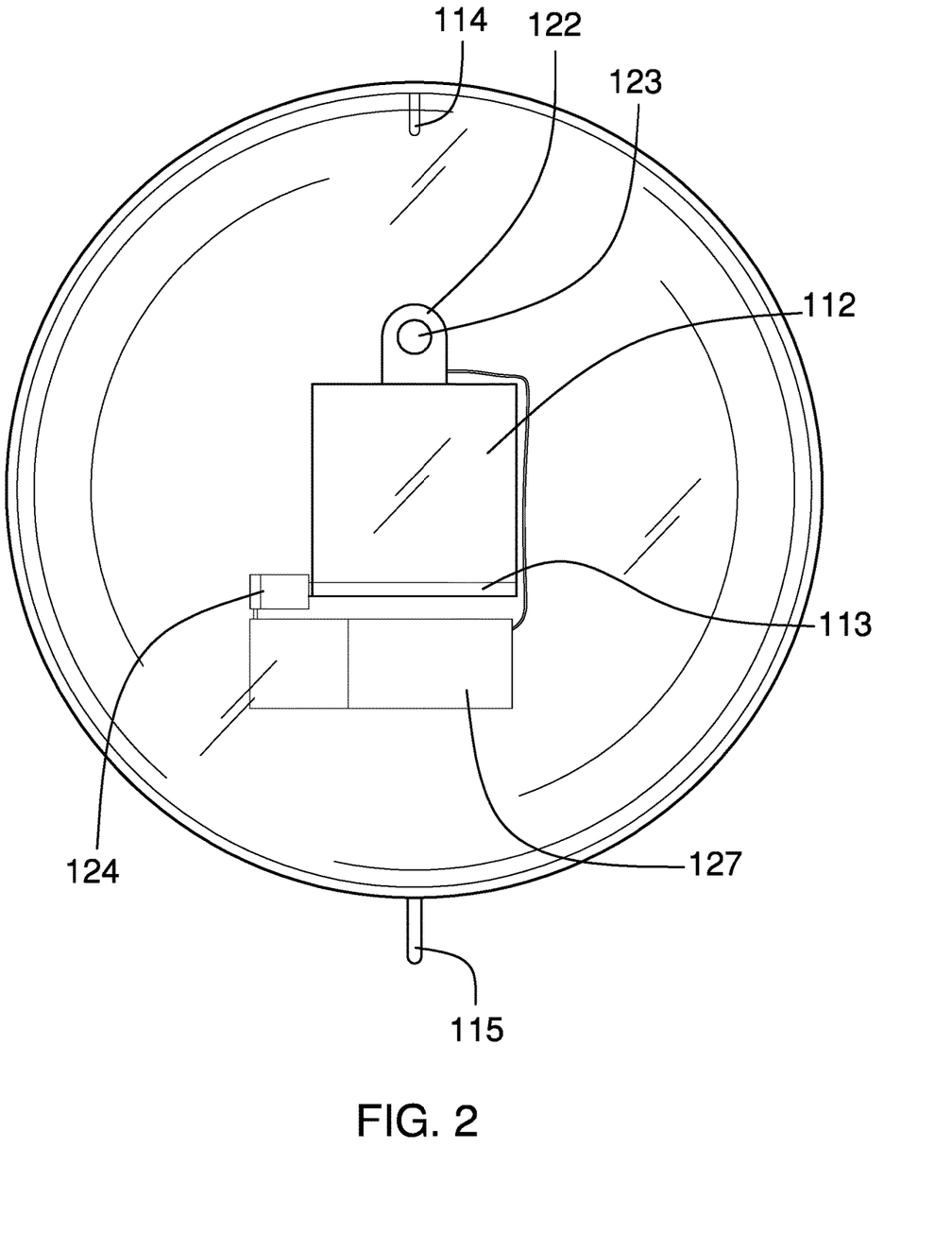
FIG. 2 is a front view of an embodiment of the disclosure.
Figure 3:
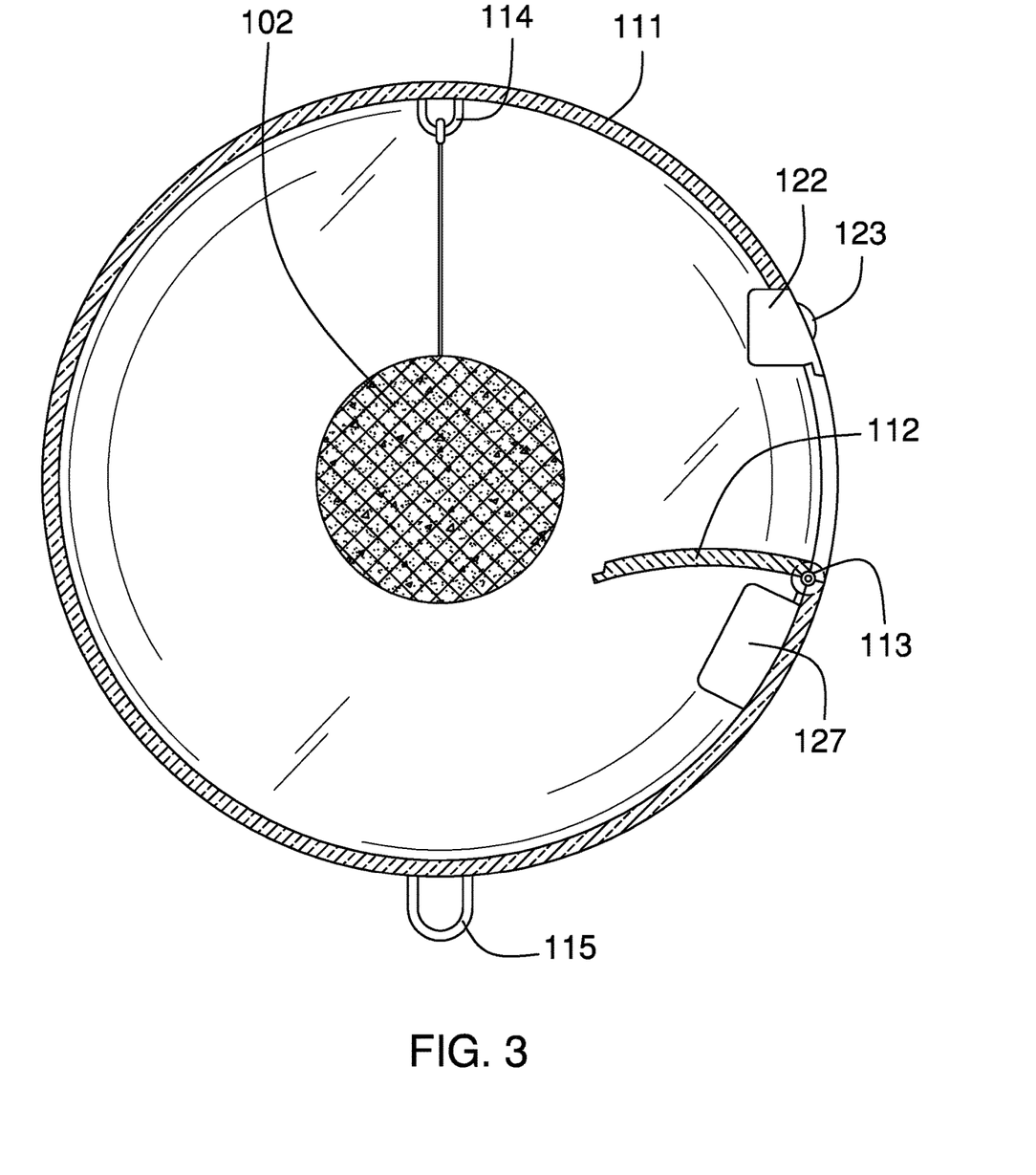
FIG. 3 is a side view of an embodiment of the disclosure.
Figure 4:
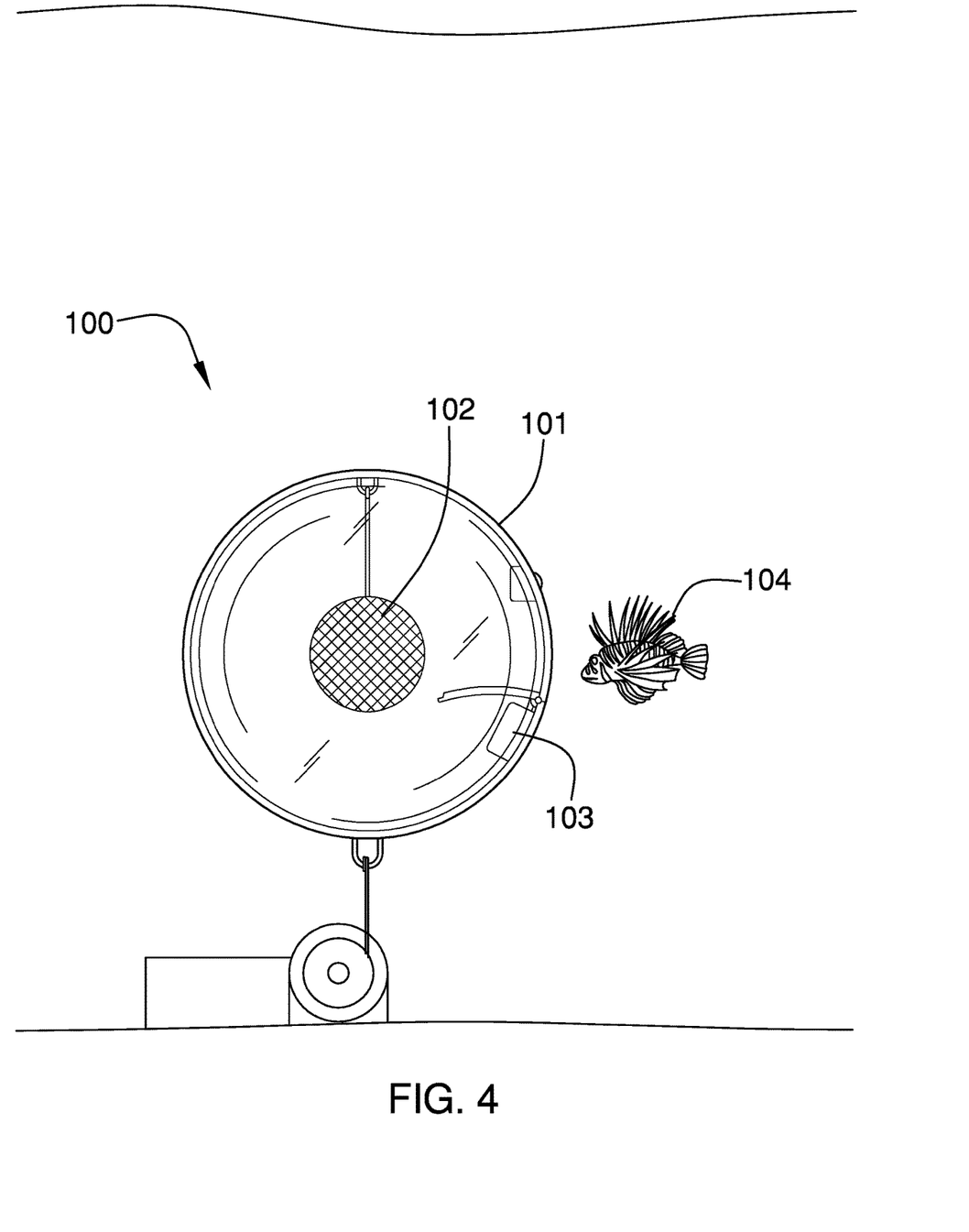
FIG. 4 is an in-use view of an embodiment of the disclosure.

The invention 100 is placed in a body of water that contains the selected species of fish 104.

The operation of the invention 100 relies upon: a) the reflective pattern of the selected species of fish 104 to electromagnetic and ultrasonic radiations being distinctive; and, b) the pattern recognition software 131 being sufficiently trained to recognize the selected species of fish 104 from the electromagnetic and ultrasonic radiations reflected from the selected species of fish 104.

The access door 112 of the transparent shell 101 is open such that any fish 104 that is attracted to the lure net 102 can enter the transparent sphere 111. When a fish 104 enters the transparent sphere 111 through the access door 112, the fish 104 breaks the break beam sensor 125 to alert the logic module 121 that a fish 104 has entered the transparent shell 101. The logic module 121 then closes the access door 112 using the motor 124.

The logic module 121 will activate the broadband transmitter 122 to generate a radiation selected from the group consisting of a) electromagnetic radiation; b) ultrasonic radiation; and, 3) a combination of electromagnetic radiation and ultrasonic radiation. The logic module 121 detects the reflections off the fish 104 using the receiver 123. The logic module 121 processes the reflected radiation detected by the receiver 123 through the pattern recognition software 131.

If the logic module 121 determines from the reflected radiation from the fish 104 matches the parameters of the selected species of fish 104 contained in the pattern recognition software 131, the access door 112 remains closed. If the logic module 121 determines from the reflected radiation from the fish 104 does not match the parameters of the selected species of fish 104, the logic module 121 opens the access door 112 using the motor 124.

The logic module 121 controls the operation of the motor 124 through the motor controller 141.

The following definitions were used in this disclosure:

Anchor: As used in this disclosure, anchor means to hold an object firmly or securely.

Anchor Point: As used in this disclosure, an anchor point is a location to which a first object can be securely attached to a second object.

Algorithm: As used in this disclosure, an algorithm is a previously defined procedure used to perform a specified task.

Artificial Intelligence: As used in this disclosure, artificial intelligence refers to a programmable logic module that is configured to perform tasks in a manner that simulates human intelligence.

Bag: As used in this disclosure, a bag is a container made of a flexible material. The bag has a single opening which allows the bag to receive the items to be contained.

Break Beam Sensor: As used in this disclosure, a break beam sensor is a motion sensing device. The break beam sensor comprises a beam generator and a beam detector. The beam generator generates a beam of electromagnetic radiation (visible or not visible) that detected by the beam detector. The beam of electromagnetic radiation forms a trip wire in the sense that if an object passes through the transmission of the beam of electromagnetic radiation is interrupted. This interruption of the beam of electromagnetic radiation is detected by the beam detector. The interruption of the beam of electromagnetic radiation is taken to imply that an object has moved through the area within which the beam of electromagnetic radiation is transmitted.

Closed Position: As used in this disclosure, a closed position refers to a movable barrier structure that is in an orientation that prevents passage through a port or an aperture. The closed position is often referred to as an object being "closed." Always use orientation.

Control System: As used in this disclosure, a control system is a first device or system that manages and regulates the behavior or operation of a second device or system.

Copolymer: As used in this disclosure, a copolymer is a polymer formed from two or more repeating molecules (also referred to as monomers).

Door: As used in this disclosure, a door is a movable or removable barrier that is attached to a chamber for the purpose of allowing or preventing access through an aperture into the chamber.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical, and AC power can be used by exchanging the DC electric motor with an AC motor that has a reversible starter winding.

Form Factor: As used in this disclosure, the term form factor refers to the size and shape of an object.

Hinge: As used in this disclosure, a hinge is a device that permits the turning, rotating, or pivoting of a first object relative to a second object.

Hook: As used in this disclosure, a hook is an object that is curved or bent at an angle such that items can be hung on or caught by the object.

Housing: As used in this disclosure, a housing is a rigid casing that encloses and protects one or more devices.

Iridescence: As used in this disclosure, iridescence refers to a source of reflected light wherein the wavelength of the reflected light changes as a function of the angle at which the source of the reflected light is viewed.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

Lure: As used in this disclosure, a lure is an object used to attract an animal towards an object.

Mesh: As used in this disclosure, the term mesh refers to an openwork textile made from threads, yarns, cords, wires, or lines that are woven, knotted, or otherwise twisted or intertwined at regular intervals. Synonyms for mesh include net.

Microphone: As used in this disclosure, a microphone is a transducer that converts the energy from vibration into electrical energy. The sources of vibrations include, but are not limited to, acoustic energy.

Monomer: As used in this disclosure, a monomer refers to a molecular structure that bonds to itself in a repeating manner to form a polymer.

Motor: As used in this disclosure, a motor refers to the method of transferring energy from an external power source into mechanical energy.

Motor Controller: As used in this disclosure, a motor controller is an electrical device that is used to control the rotational speed, or simply the speed of the motor, and the direction of rotation of an electric motor. Motor controllers will generally receive one or more inputs which are used determine the desired rotational speed and direction of rotation of the electric motor.

Open Position: As used in this disclosure, an open position refers to a movable barrier structure that is in an orientation that allows passage through a port or an aperture. The open position is often referred to as an object being "open."

Openwork: As used in this disclosure, the term open work is used to describe a structure, often a surface, which is formed with openings that allow for visibility and fluid flow through the structure. Wrought work and meshes are forms of openwork.

Organic: As used in this disclosure, organic refers to a carbon-based chemical structure. A limited number of carbon-based salts are traditionally considered inorganic chemical structures and are excluded from the study of organic chemistry.

Orientation: As used in this disclosure, orientation refers to the positioning of a first object relative to: 1) a second object; or, 2) a fixed position, location, or direction.

Pattern Recognition Software: As used in this disclosure, pattern recognition software refers to a series of algorithms used to identify a captured pattern with a database of one or more previously captured and stored patterns. The captured pattern is assumed to be captured by a sensor. The pattern recognition software is often associated with artificial intelligence.

Plastic: As used in this disclosure, plastic refers to a manufactured material that is formed from a structure selected from the group consisting of a polymer or a copolymer. Unless stated otherwise, this disclosure assumes that the plastic is formed from organic monomers.

Polymer: As used in this disclosure, a polymer refers to a molecular chain that comprises multiple repeating units known as monomers. The repeating unit may be an atom or a molecular structure.

Receiver: As used in this disclosure, a receiver is a device that is used to receive and demodulate electromagnetic radiation such as radio signals.

Reflection: As used in this disclosure, a reflection refers to the change of direction of a wave that occurs when the wave impacts a surface.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Shell: As used in this disclosure, a shell is a structure that forms an outer covering intended to contain an object. Shells are often, but not necessarily, rigid or semi-rigid structures that are intended to protect the object contained within it.

Speaker: As used in this disclosure, a speaker is an electrical transducer that converts an electrical signal into an audible sound.

Textile: As used in this disclosure, a textile is a material that is woven, knitted, braided or felted. Synonyms in common usage for this definition include fabric and cloth.

Transducer: As used in this disclosure, a transducer is a device that converts a physical quantity, such as pressure or brightness into an electrical signal or a device that converts an electrical signal into a physical quantity.

Transmitter: As used in this disclosure, a transmitter is a device that is used to generate and transmit electromagnetic radiation such as radio signals.

Transparent: As used in this disclosure, transparent refers to a material that allows light to pass through the material without significant scattering such that an object can be clearly seen through the material.

Ultrasonic: As used in this disclosure, ultrasonic is understood to be the transmission of energy using waves through a medium wherein the frequency of the wavelength is greater than 20 kHz. This disclosure assumes that the range of the wavelength is between 20 kHz and 20 MHz. By medium is meant a substance in a gas, liquid or solid phase.

Ultraviolet Light: As used in this disclosure, ultraviolet light is understood to be electromagnetic radiation with a wavelength lesser than visible light. In general usage, ultraviolet light is taken to mean electromagnetic radiation with a wavelength less than 400 nm.

UV: As used in this disclosure, UV is an abbreviation for ultraviolet.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A fish trap comprising:
a transparent shell, a lure net, and a control system;
wherein the lure net and the control system mount on the transparent shell;
wherein the transparent shell is the structure that lures and captures the specific species of fish;
wherein the lure net lures a fish into the transparent shell;
wherein the control system controls access into the transparent shell;
wherein the transparent shell comprises a transparent sphere, an access door, an access hinge, an interior hook, and an exterior hook;
wherein the access hinge attaches the access door to the transparent sphere;
wherein the interior hook and the exterior hook attach to the transparent sphere;
wherein the interior hook forms an anchor point to which the lure net attaches;
wherein the exterior hook forms an anchor point that allows the transparent sphere to remain proximal to a fixed position.

2. The fish trap according to claim 1
wherein the fish trap is adapted for use with a fish;
wherein the fish trap lures a fish into the fish trap;
wherein the fish trap selectively captures a specific species of fish;
wherein the selected species of fish is a species of fish that is targeted for capture by the fish trap;
wherein the fish trap identifies that a captured fish is the specific species the fish trap is configured to capture;
wherein the fish trap closes when the lured fish is identified as the specific species that the fish trap is configured to capture;
wherein the control system identifies the species of the lured fish.

3. The fish trap according to claim 2
wherein the transparent shell is the containment structure of the fish trap;

wherein the transparent shell is a hollow structure;
wherein the transparent shell is a casing;
wherein the transparent shell contains the lure net and the control system.

4. The fish trap according to claim 3
wherein the lure net is a fish lure that is contained within a mesh bag;
wherein the fish lure of the lure net is contained within the mesh bag;
wherein the mesh bag attaches the lure of the lure net to the interior surface of the transparent shell;
wherein the lure of the lure net is selected such that the lure net will attract the selected species of fish.

5. The fish trap according to claim 4
wherein the control system is an electromechanical device;
wherein the control system detects when a fish has entered the transparent shell;
wherein the control system traps the fish within the transparent shell;
wherein the control system determines whether the captured fish is the selected species of fish;
wherein the control system releases the captured fish if the captured fish is not recognized as the selected species of fish.

6. The fish trap according to claim 5
wherein the transparent sphere is the hollow structure of the transparent shell;
wherein the transparent sphere is a spherical structure;
wherein the transparent sphere is a transparent structure;
wherein the transparent sphere is a plastic structure.

7. The fish trap according to claim 6
wherein the access door is a rotating barrier;
wherein the access door controls access into the hollow interior of the transparent sphere;
wherein the access door encloses an opening formed in the transparent sphere;
wherein the access door is further defined with a closed position and an open position;
wherein the closed position traps the fish within the transparent sphere;
wherein the open position allows the fish access into and out of the transparent sphere.

8. The fish trap according to claim 7
wherein the access hinge is a rotating device;
wherein the access hinge attaches the access door to the transparent sphere such that the access door rotates relative to the transparent sphere.

9. The fish trap according to claim 8
wherein the control system comprises a logic module, a broadband transmitter, a receiver, a motor, a break beam sensor, a battery, and a housing;
wherein the logic module, the broadband transmitter, the receiver, the motor, the break beam sensor, and the battery are contained in the housing;
wherein the logic module, the broadband transmitter, the receiver, the motor, the break beam sensor, and the battery are electrically interconnected.

10. The fish trap according to claim 9
wherein the logic module is an electrical device;
wherein the logic module is a programmable device;
wherein the logic module manages and regulates the operation of the control system;
wherein the logic module controls the operation of the broadband transmitter;
wherein the logic module controls the operation of the receiver;
wherein the logic module receives an electrical signal from the receiver;
wherein the logic module monitors the operation of the break beam sensor.

11. The fish trap according to claim 10
wherein the logic module further comprises a pattern recognition software;
wherein the logic module implements the pattern recognition software such that the logic module identifies the selected species of fish.

12. The fish trap according to claim 11
wherein the broadband transmitter is an electrical device;
wherein the broadband transmitter generates a radiation that is reflected from the fish;
wherein the radiation generated by the broadband transmitter is selected from the group consisting of: a) electromagnetic radiation; b) ultrasonic radiation; and, c) a combination of electromagnetic radiation and ultrasonic radiation.

13. The fish trap according to claim 12
wherein the receiver detects the radiation generated by the broadband transmitter that is reflected off of the fish;
wherein the receiver converts the detected reflected radiation into the electrical signal that is transmitted to the logic module.

14. The fish trap according to claim 13
wherein the motor is an electrical motor;
wherein the motor is a submersible motor;
wherein the motor attaches to the access door such that the rotation of the motor rotates the access door;
wherein the motor rotates the access door between the open position and the closed position.

15. The fish trap according to claim 14
wherein the motor further comprises a motor controller;
wherein the operation of the motor is controlled by the motor controller;
wherein the motor controller is an electrical circuit that controls the rotation of the motor;
wherein the logic module provides the motor controller with the inputs required to operate the motor;
wherein the logic module controls the operation of the motor using the motor controller.

16. The fish trap according to claim 15
wherein the break beam sensor is a motion sensing device;
wherein the break beam sensor generates a beam of non-visible electromagnetic radiation between two sensors;
wherein the entry of the fish into the transparent sphere interrupts the beam of non-visible electromagnetic radiation between two sensors such that the logic module will recognize that a fish has entered the transparent sphere;
wherein the break beam sensor triggers the logic module to move the access door into the closed position.

17. The fish trap according to claim 16
wherein the battery is a chemical device;
wherein the battery provides the electrical energy required to operate the control system;
wherein the housing is a fluid impermeable structure that mounts on the transparent sphere.

18. The fish trap according to claim 17 wherein the transparent sphere is formed from a polymer selected from the group consisting of: a) poly(methyl methacrylic) (CAS 9011-14-7); and, b) poly[oxycarbonyloxy-1,4-phenylene(1-methylethylidene)-1,4-phenylene] (CAS 24936-68-3).

19. The fish trap according to claim 18
wherein the interior hook attaches to the interior surface of the transparent sphere;
wherein the exterior hook attaches to the exterior surface of the transparent sphere.

\* \* \* \* \*